United States Patent
Khurana

(10) Patent No.: US 11,862,020 B2
(45) Date of Patent: Jan. 2, 2024

(54) PARKING APPLICATION AND MANAGEMENT SYSTEM

(71) Applicant: Honeywell International Inc., Morris Plains, NJ (US)

(72) Inventor: Himanshu Khurana, Plymouth, MN (US)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 367 days.

(21) Appl. No.: 16/930,297

(22) Filed: Jul. 15, 2020

(65) Prior Publication Data

US 2021/0005083 A1 Jan. 7, 2021

Related U.S. Application Data

(63) Continuation of application No. 15/257,244, filed on Sep. 6, 2016, now abandoned.

(60) Provisional application No. 62/215,490, filed on Sep. 8, 2015.

(51) Int. Cl.
*G08G 1/14* (2006.01)
*G07B 15/02* (2011.01)
*G08G 1/017* (2006.01)
*G01C 21/36* (2006.01)

(52) U.S. Cl.
CPC ......... *G08G 1/144* (2013.01); *G01C 21/3685* (2013.01); *G07B 15/02* (2013.01); *G08G 1/0175* (2013.01); *G08G 1/146* (2013.01)

(58) Field of Classification Search
CPC ...... G08G 1/144; G08G 1/146; G08G 1/0175; G06Q 10/06; G07B 15/02; G01C 21/3685
See application file for complete search history.

(56) References Cited

U.S. PATENT DOCUMENTS

| | | | |
|---|---|---|---|
| 6,865,539 B1 * | 3/2005 | Pugliese, III | G06Q 10/025 705/5 |
| 8,432,297 B2 | 4/2013 | Sonnabend et al. | |
| 9,754,487 B1 | 9/2017 | Woodard et al. | |
| 2004/0068433 A1 | 4/2004 | Chatterjee et al. | |

(Continued)

FOREIGN PATENT DOCUMENTS

DE 102012216994 A1 3/2014

OTHER PUBLICATIONS

Klappenecker, A., Lee, H., Welch, J. L. (2014). Finding available parking spaces Made Easy. Ad Hoc Networks, 12, 243-249 https://doi.org/10.1016/j.adhoc.2012.03.002 (Year: 2014).*

(Continued)

*Primary Examiner* — Shannon S Campbell
*Assistant Examiner* — Manal A. Alsamiri
(74) *Attorney, Agent, or Firm* — Seager, Tufte & Wickhem, LLP

(57) ABSTRACT

Devices, methods, and systems for parking management are described herein. One device includes instructions which, when executed by a processor, cause the processor to receive a first indication via a mobile device that a user intends to park a vehicle in a parking spot of a parking area, display directions to an available parking spot in the parking area via the mobile device, receive a second indication via the mobile device that the user has parked the vehicle in the available parking spot, and provide a third indication via a different mobile device that the available parking spot is no longer available.

18 Claims, 2 Drawing Sheets

(56) References Cited

U.S. PATENT DOCUMENTS

| | | | |
|---|---|---|---|
| 2004/0254840 A1 | 12/2004 | Slemmer et al. | |
| 2010/0007525 A1 | 1/2010 | Shanbhag et al. | |
| 2012/0095790 A1* | 4/2012 | Stefik | G08G 1/14 |
| | | | 705/5 |
| 2012/0265434 A1 | 10/2012 | Woodard et al. | |
| 2014/0176348 A1* | 6/2014 | Acker, Jr. | G08G 1/04 |
| | | | 340/932.2 |
| 2014/0176349 A1 | 6/2014 | Smullin et al. | |
| 2016/0104325 A1* | 4/2016 | Lu | G06Q 10/00 |
| | | | 705/13 |
| 2016/0178376 A1* | 6/2016 | Moore | G08G 1/0133 |
| | | | 701/538 |
| 2016/0189324 A1* | 6/2016 | Eramian | H04W 4/40 |
| | | | 705/13 |

OTHER PUBLICATIONS

Rinne, et al.; "Mobile Crowdsensing of Parking Space using Geofencing and Activity Recognition," 10th ITS European Congress, 11 pages, Jun. 16-19, 2014.

* cited by examiner

PARKING APPLICATION AND MANAGEMENT SYSTEM

PRIORITY INFORMATION

The present application is a continuation of This is a continuation application of co-pending U.S. patent application Ser. No. 15/257,244, filed Sep. 6, 2016, which claims the benefit of U.S. Provisional Application Ser. No. 62/215,490, filed Sep. 8, 2015, both of which are incorporated herein by reference.

TECHNICAL FIELD

The present disclosure relates to devices, methods, and systems for parking management.

BACKGROUND

People may park their vehicle in a managed parking area, such as a lot or ramp, for instance. These areas may be found at locations such as airports, hotels, downtown areas, sporting venues, events, and/or shopping malls, for example. In some instances, people may contract with an entity (e.g., an individual and/or company) managing a managed parking area on a monthly and/or yearly basis. In some instances, the management entity may charge for parking on a per-use basis. For example, parking may be paid for on an hourly and/or daily basis.

Previous approaches to parking management may use expensive infrastructure for managing access and/or revenue. That infrastructure can include pay stations, credit card readers, and/or gates, among others. In previous approaches, that infrastructure may undergo frequent updates to adjust to changing revenue methods, changing usage patterns, and/or changing size of the area. Moreover, infrastructure used in previous approaches may require capital investments for their installation, maintenance, and updating.

DETAILED DESCRIPTION

Figure 1:
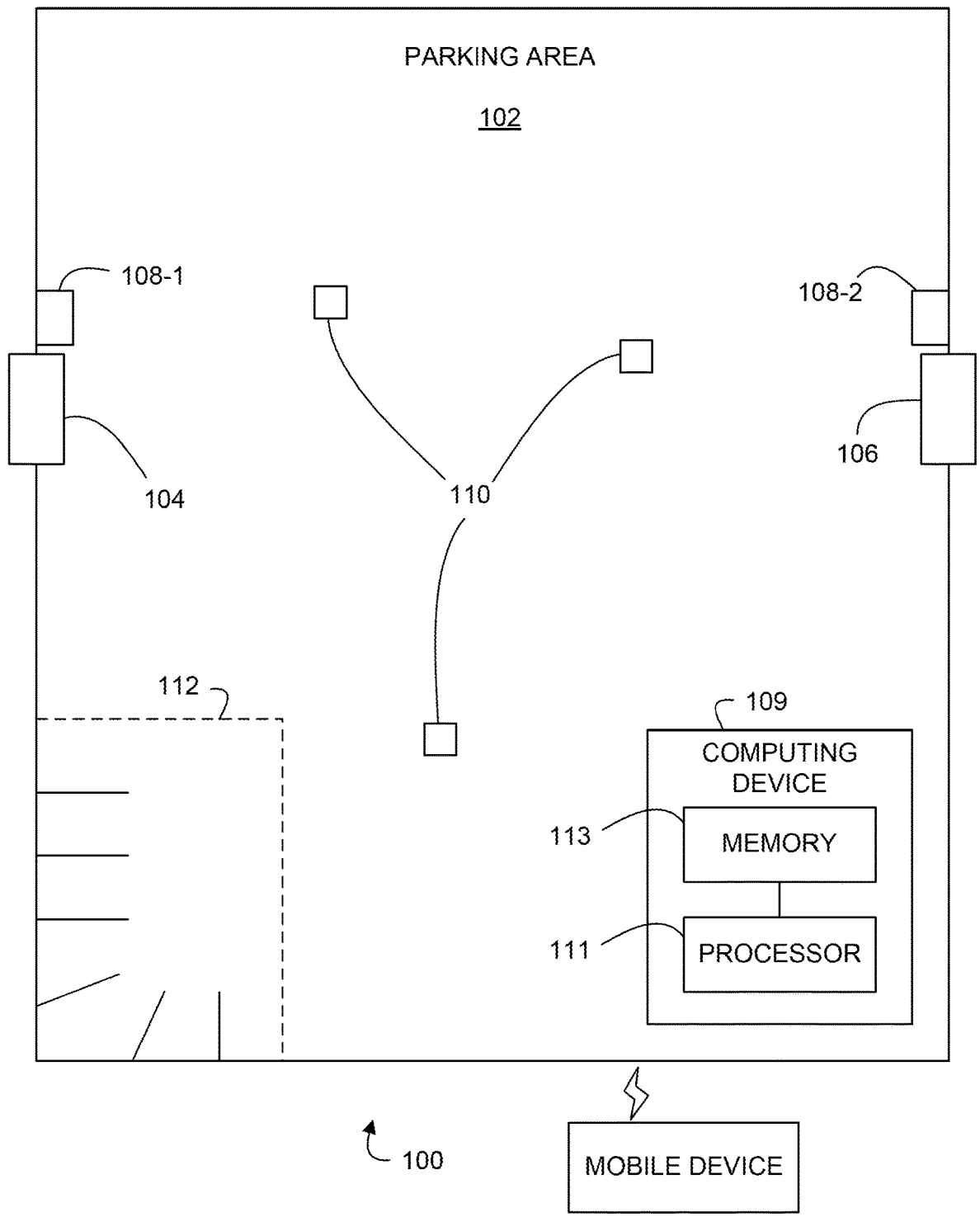
FIG. 1 illustrates a system for parking management in accordance with one or more embodiments of the present disclosure.

Devices, methods, and systems for parking management are described herein. Parking management in accordance with one or more embodiments of the present disclosure can reduce (e.g., eliminate) the need for expensive infrastructure relied upon in previous approaches. Instead of expensive infrastructure, embodiments of the present disclosure can allow parking management to be carried out by device(s), such as smart phones, carried by users.

In some embodiments, users can enter a parking area without waiting for a pay station and/or gate to allow them access. An app (computer-executed instructions) on their device can communicate with one or more devices of the parking area, thereby providing a variety of functionalities. In some embodiments, a display can be provided that shows available parking spots (e.g., designated spaces, areas, etc. for parking a vehicle) and/or guides the user to an available parking spot. In some embodiments, users can "hold" a parking spot such that the spot is shown as held and not available to other users. In some embodiments, users can "reserve" the spot upon reaching it and indicate that they have parked in the held spot.

According to one or more embodiments of the present disclosure, upon returning to the parking area, users can be guided to their vehicle and payment can be made automatically (e.g., based on the amount of time the vehicle was parked in the parking area). Payment can be made upon leaving the parking area; payment can be made upon entering the parking area. In some embodiments, payment can be made on a regular basis (e.g., weekly, monthly, yearly, etc.). Users can exit the parking area without waiting for a pay station and/or gate to allow them to exit.

Parking management in accordance with one or more embodiments of the present disclosure can utilize one or more devices to track vehicle movement. For example, some embodiments can include license plate readers at an entrance and/or exit of a parking area (as well as in other areas). Thus, embodiments herein can track which vehicle(s) have entered the area and which vehicle(s) have exited the area. Some embodiments can include wireless beacons (e.g., Bluetooth Low Energy (BLE) and/or WiFi beacons) in the parking area to track vehicle movement.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of vehicles" can refer to one or more vehicles.

FIG. 1 illustrates a system 100 for parking management in accordance with one or more embodiments of the present disclosure. As shown in FIG. 1, system 100 includes a parking area 102 and a mobile device 107.

The parking area 102 can be an area having a plurality of parking spots therein allowing users to park vehicle(s). The parking area 102 can be located at an airport, a hotel, a downtown area, a sporting venue, an event, and/or a shopping mall, for example, though embodiments of the present disclosure do not limit the parking area 102 to a particular location. Users may contract with an entity (e.g., an individual and/or company) managing the parking area 102 to park in the parking area 102. Such a contract may be made for a monthly and/or yearly basis, for instance. The entity managing the parking area 102 may charge for parking on a per-use basis. For example, parking may be paid for on an hourly and/or daily basis.

The parking area 102 can include an entrance 104 and an exit 106. The entrance 104 can be an opening to the parking area 102 allowing vehicles to enter the parking area 102. The exit 106 can be an opening to the parking area 102 allowing vehicles to exit the parking area 102. In some embodiments, the entrance 104 and the exit 106 can be a same opening to the parking area 102. In some embodiments, the entrance 104 and/or the exit 106 can include a gate. In some embodiments, neither the entrance 106 nor the exit 106 include a gate.

A license plate reader (hereinafter "entrance reader") 108-1 can be positioned at the entrance 104 of the parking area 102. The reader 108-1 can determine a license plate number of a vehicle entering the parking area 102. The license plate number of vehicles that have entered the parking area 102 can be stored in a memory of a computing device, for instance (e.g., memory 113 of computing device 109, discussed below).

Another reader (hereinafter "exit reader") 108-2 can be positioned at the exit 106 of the parking area 102. The exit reader 108-2 can determine a license plate number of a vehicle exiting the parking area 102. As discussed further below, the entrance reader 108-1 and the exit reader 108-2 can be used in conjunction to determine a number of vehicles present in the parking area 102, as well as specific license plate numbers of those vehicles.

The system 100 can include a mobile device 107. The mobile device 107 can be a smart phone, for instance, though embodiments of the present disclosure are not so limited. For example, the mobile device 107 can be a tablet, a personal digital assistant (PDA), and/or a transponder (hereinafter "token"), which may be affixed to a vehicle. The mobile device 107 can wirelessly communicate with a number of devices described herein. For instance, the mobile device 107 can communicate with a computing device 109 and/or a plurality of beacons 110 (discussed below).

The parking area 102 can include a plurality of beacons 110. Although three beacons 110 are illustrated in FIG. 1, system 100 can include more or fewer than three beacons 100. The beacons 100 can wirelessly communicate with the mobile device 107. The beacons 100 can be BLE beacons, radio-frequency identification (RFID) beacons, and/or WiFi beacons, among others. The beacons 100 can be positioned throughout the parking area 102. The beacons 100 can be used to trilaterate, triangulate, and/or otherwise determine a location of vehicles (via mobile devices carried therein) within the parking area 102.

The parking area 102 can include a zone 112. As shown, the zone 112 can include a plurality of parking spots. Though seven spots are shown in the zone 112, zones in accordance with the present disclosure are not limited to a particular number of spots. Further, a parking area can include a plurality of zones having different numbers of spots. In some embodiments, a beacon of the plurality of beacons 110 can be associated with the zone 112. That is, a beacon can determine when a vehicle has entered the zone 112. In some embodiments, each of a plurality of zones is associated with a respective beacon.

Using the beacons 110, embodiments of the present disclosure can track vehicle movement throughout the parking area 102. Although not shown in FIG. 1, some embodiments of the present disclosure can include license plate readers (analogous to the entrance reader 108-1 and/or the exit reader 108-2) positioned throughout the parking area 102. Thus, movements and/or locations of particular vehicles can be determined.

The system 100 includes a computing device 109. The computing device 109 can be, for example, a laptop computer, a desktop computer, or a mobile device (e.g., a mobile phone, a personal digital assistant, etc.), among other types of computing devices.

As shown in FIG. 1, computing device 109 includes a memory 113 and a processor 111 coupled to memory 113. Memory 113 can be any type of storage medium that can be accessed by processor 111 to perform various examples of the present disclosure. For example, memory 113 can be a non-transitory computer readable medium having computer readable instructions (e.g., computer program instructions) stored thereon that are executable by processor 111 to store license plate numbers determined by the entrance reader 104 and/or the exit reader 106 in accordance with one or more embodiments of the present disclosure.

Memory 113 can be volatile or nonvolatile memory. Memory 113 can also be removable (e.g., portable) memory, or non-removable (e.g., internal) memory. For example, memory 113 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 113 is illustrated as being located in computing device 109, embodiments of the present disclosure are not so limited. For example, memory 113 can also be located internal to another computing resource (e.g., enabling computer readable instructions to be downloaded over the Internet or another wired or wireless connection).

Though not shown in FIG. 1 so as not to obscure embodiments of the present disclosure, the mobile device 107 can be and/or include a computing device analogous to the computing device 109. That is, the mobile device 107 can include a memory that can be accessed by a processor to perform various examples of the present disclosure.

In some embodiments, the mobile device 107 can receive (e.g., download) computer executable instructions (e.g., an application) configured to allow the mobile device 107 to interact with devices of the parking area 102. The application can include a customized display with menus and/or selectable display elements. In some embodiments where the mobile device 107 is a token, the token may be acquired from an entity managing the parking area 102. A user may register the token with the entity before parking at the parking area 102.

Figure 2:
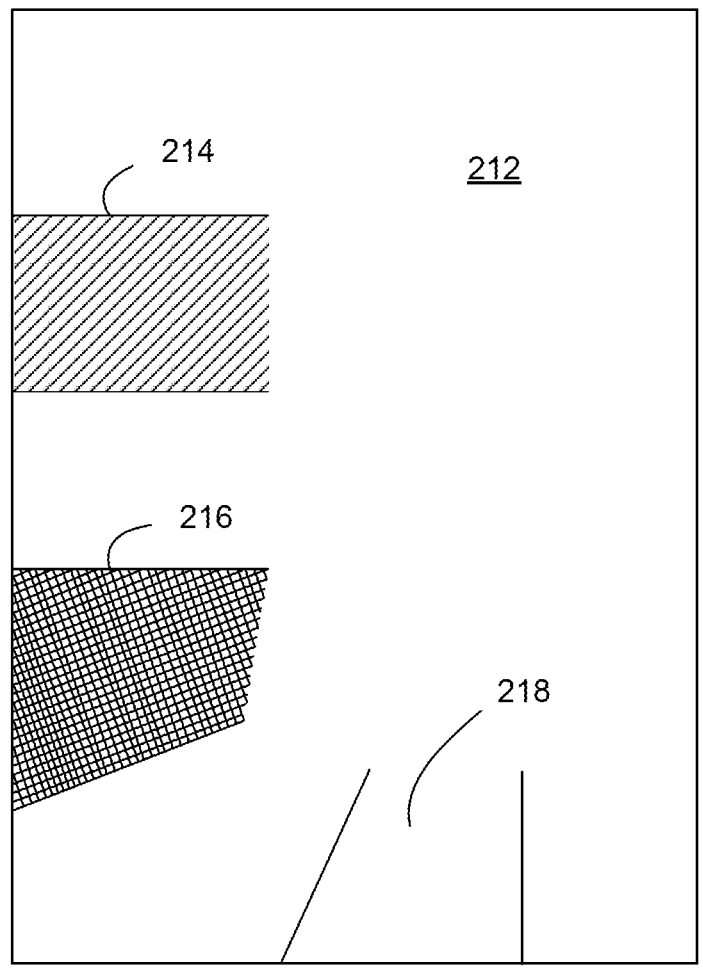
FIG. 2 illustrates an example display for parking management in accordance with one or more embodiments of the present disclosure.

A user using the mobile device 107 can open the application before entering the parking area 102, for instance. Because the entrance reader 108-1 and exit reader 108-2 can determine the quantity of vehicles in the parking area 102, the app can inform the user in real-time whether there are any parking spots available in the parking area 102. The beacons 110 can allow the determination of which spots or which zones may be available for parking. Real-time capabilities provided by one or more embodiments of the present disclosure can be enabled though the use of a cloud-based application, for instance. For example, a cloud-based application can update a "master" set of data when a user The user can be displayed a rendering of the parking area 102 and/or a portion of the parking area 102 (e.g., zone 112). FIG. 2 illustrates an example display 212 for parking management in accordance with one or more embodiments of the present disclosure. The display 212 can include a detailed rendering of the zone 112, previously described in connection with FIG. 1. The display 212 can show which spots of the parking area are available, held, and/or reserved. Upon entering the parking area 102 (or before entering the parking area 102), the user can select an available spot in which the user desires to park. An example display of an available spot is illustrated in FIG. 2 as available spot 218.

In some embodiments, the user can "hold" an available parking spot by selecting it. That is, the user can indicate that he or she intends to park in the available spot 218 by selecting the available spot 218. The selection can be made using the mobile device by touching an icon or area of the mobile device display corresponding to the available spot, for instance, though embodiments of the present disclosure are not so limited.

The selected (held) spot can then be highlighted using a particular color (e.g., yellow), for instance, which can inform other users of the application that the spot is now held, and therefore no longer available. If a spot is held it may be prevented from being "reserved" by other users. An example "held" spot is indicated in FIG. 2 as held spot 214. It is noted that holding spots may be prevented in cases where the vehicle occupancy of the parking area exceeds a particular threshold (e.g., above 95% full).

The user can be guided (e.g., navigated) to the held spot 214 via the mobile device. In some embodiments, the user can be provided with turn-by-turn directions to the held spot 214. In some embodiments, a path to the held spot can be provided via the display 212. Once the user reaches the held spot 214, the user can indicate via the mobile device that the spot has indeed been taken as a parking spot. That is, the user can "reserve" the spot. In some embodiments, the reserved spot can be highlighted using a different color than that used for the held spot 214, for instance (e.g., red). An example "reserved" spot is indicated in FIG. 2 as reserved spot 216.

In some embodiments, in addition to, or instead of, the rendering of individual spots in different colors, zones may be displayed using different colors based on a number of spots available, held, and/or reserved therein. Users can quickly identify one or more zones likely to have available spots.

When the user desires to return to the parking area (to the user's vehicle in the parking area), the user can be guided to the user's vehicle. Upon the user's exit from the parking area, embodiments of the present disclosure can remove the "reserved" indicator from the spot the user parked in and display it as available to other users.

As previously discussed, embodiments can determine a length of time the vehicle spent in the parking area (e.g., via the entrance reader 108-1 and exit reader 108-2). Payment for the use of the parking area can be made via the application, for instance, which may be pre-loaded with payment information (e.g., credit card information and/or authorization) associated with the user. In some embodiments, payment may be processed automatically (e.g., without user input). In some embodiments, payment may involve one or more user inputs (e.g., authentication and/or authorization).

The application may correlate to a remotely-accessible interface (e.g., web page), for instance. The user can use the interface and/or the application to manage his or her account with the application and/or with the entity managing the parking area. In some embodiments, the user account can include information (e.g., pre-registered information) such as license plate numbers of user vehicle(s), vehicle information, and/or payment information, for instance.

Because embodiments of the present disclosure can allow parking management to be carried out by a mobile device rather than infrastructure at the parking area, user experience can be streamlined. For example, gates at the entrance and/or exit of the parking area may be removed, and bottlenecks thereby reduced. Rather than waiting in line to enter and/or exit the parking area, users may enter or exit unabated by traffic. Further, rather than driving around the parking area in search of an available spot, users can be guided directly to an available spot and/or one or more zones having available spots.

In addition, embodiments of the present disclosure can receive information from outside sources to enhance user experience. In an example where the parking area is at an airport, embodiments of the present disclosure can receive flight information of the user via the mobile device. Embodiments of the present disclosure can use that information to predict when spots will be taken and/or become available, for instance.

Embodiments of the present disclosure can provide functionalities to management entities in addition to those provided to users. For example, embodiments of the present disclosure can provide occupancy information, usage patterns, and/or revenue streams to management entities. Embodiments of the present disclosure can update occupancy and/or usage on a real-time basis, allowing management entities to employ dynamic pricing strategies based on availability and/or demand, for instance. Management entities could be apprised of which vehicles are parking in the parking area, for how long, and how often. In some embodiments, management entities can access usage, occupancy and/or payment information using one or more computing devices (e.g., via a web page, mobile app, etc.).

Embodiments of the present disclosure can provide increased automation and therefore utilize fewer employed personnel than previous approaches. The ability to capture license plate numbers and track vehicles throughout the parking area can provide enhanced security and vehicle locating capabilities to management entities.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A system for parking management, comprising:
   a first reader associated with an entrance of a parking area and configured to determine that a vehicle has entered the parking area;
   a second reader associated with an exit of the parking area and configured to determine that the vehicle has exited the parking area;
   a plurality of beacons associated with the parking area;
   a computing device, configured to:
      receive an indication of the vehicle entering the parking area from the first reader;
      track a location of the vehicle in the parking area based at least in part on communications between the plurality of beacons and a mobile device associated with the vehicle;
      receive from the mobile device an indication that the vehicle is parked in a particular parking spot;
      receive flight information from the mobile device that is associated with the vehicle, and subsequent to receiving from the mobile device the indication that the vehicle is parked in the particular parking spot, associate the received flight information with the particular parking spot in which the vehicle is parked;
      predict when the particular parking spot in which the vehicle is parked will likely become available based at least in part upon the received flight information;
      receive an indication of the vehicle exiting the parking area from the second reader; and
      determine a length of time the vehicle spent in the parking area based on the indications from the first reader and the second reader.

2. The system of claim 1, wherein the first reader and second reader are license plate readers, and wherein the first and second indications are indications of a license plate number of the vehicle entering and exiting the parking area, respectively.

3. The system of claim 2, further comprising one or more tracking license plate readers positioned within the parking area, wherein the computing device is configured to track the location of the vehicle in the parking area based at least in part on license plate numbers read by the one or more tracking license plate readers in the parking area.

4. The system of claim 3, wherein the computing device is configured to track the location of the vehicle in the parking area based at least in part on trilateration and/or triangulation using communications between the plurality of beacons and the mobile device.

5. The system of claim 1, wherein the computing device is configured to track the location of the vehicle in the parking area based at least in part on trilateration and/or triangulation of communications between the plurality of beacons and the mobile device associated with the vehicle.

6. The system of claim 1, wherein each of the plurality of beacons is associated with a respective zone of the parking area.

7. The system of claim 1, wherein the computing device is configured to display on a display of the mobile device turn-by-turn directions in real time based on the tracked location that guide a user of the mobile device to the particular parking spot.

8. The system of claim 1, wherein the computing device is further configured to receive a reservation for a parking spot from the mobile device.

9. The system of claim 8, wherein the computing device is configured to receive an indication from the mobile device that the particular parking spot is on hold after the vehicle has entered the parking area but before the vehicle has parked in the particular parking spot.

10. The system of claim 9, wherein the computing device is configured to prevent another user from reserving the particular parking spot once it is on hold.

11. The system of claim 1, wherein the computing device is further configured to display each of a plurality of zones on a display of the mobile device, and to visually distinguish the plurality of zones according to a number of parking spots currently available in each of the respective zone.

12. The system of claim 1, wherein the computing device is configured to determine a payment to be made by a user associated with the mobile device based, at least in part, on the length of time the vehicle spent in the parking area.

13. The system of claim 12, wherein the computing device is configured to process the payment based on user information pre-registered with an entity managing the parking area.

14. A system for parking management, comprising:
   an entrance license plate reader associated with an entrance of a parking area, the entrance license plate reader is configured to read license plate numbers of vehicles entering the entrance of the parking area;
   an exit license plate reader associated with an exit of a parking area, the exit license plate reader is configured to read license plate numbers of vehicles exiting the exit of the parking area;
   one or more tracking license plate readers each positioned at a fixed position within the parking area, the one or more tracking license plate readers configured to read license plate numbers of vehicles at each respective location in the parking area;
   a computing device, configured to:
      receive an indication of a vehicle entering the parking area from the entrance license plate reader;
      determine an available parking spot in the parking area;
      designate the available parking spot as a held parking spot for the vehicle;
      track a location of the vehicle in the parking area based at least in part on license plate numbers read by the one or more tracking license plate readers in the parking area;
      provide turn-by-turn directions to a mobile device associated with the vehicle to guide a user of the mobile device to the held parking spot;
      receive an indication that the vehicle is parked in the held parking spot;
      receive flight information from the mobile device that is associated with the vehicle, and associate the received flight information with the held parking spot;
      predict when the held parking spot in which the vehicle is parked will likely become available based at least in part upon the received flight information;
      receive an indication of the vehicle exiting the parking area from the exit license plate reader; and in response to receiving the indication of the vehicle exiting the parking area, designate the parking spot previously held by the vehicle as an available parking spot.

15. The system of claim 14, wherein the computing device is configured to:
in response to receiving the indication from the mobile device associated with the vehicle that the vehicle is parked in the held parking spot, designate the held parking spot as a reserved parking spot; and
in response to receiving an indication of the vehicle exiting the parking area, designate the reserved parking spot as an available parking spot.

16. The system of claim 14, further comprising a plurality of beacons located in the parking area, and wherein the computing device is configured to track the location of the vehicle in the parking area based at least in part on communications between the plurality of beacons and the mobile device associated with the vehicle.

17. A method for parking management, comprising:
receiving an indication of a vehicle entering a parking area from an entrance license plate reader;
determining a particular parking spot in the parking area;
tracking a location of the vehicle in the parking area based at least in part on communications between a plurality of beacons associated with the parking area and a mobile device associated with the vehicle;
receiving an indication that the vehicle is parked in the particular parking spot;
receiving flight information from the mobile device that is associated with the vehicle, and associating the received flight information with the particular parking spot in which the vehicle is parked;
predicting when the particular parking spot in which the vehicle is parked will likely become available based at least in part upon the received flight information;
receiving an indication of the vehicle exiting the parking area from an exit license plate reader;
and determining a length of time the vehicle spent in the parking area based on the indications from the entrance license plate reader and the exit license plate reader.

18. The method of claim 17, further comprising tracking the location of the vehicle in the parking area based at least in part on license plate numbers read by one or more tracking license plate readers associated with the parking area.

* * * * *